Aug. 11, 1959  F. P. ALLES  2,899,200
MECHANISM FOR POSITIONING AN ADHESIVE STRIP
MATERIAL IN A SPLICING APPARATUS
Filed April 22, 1958

INVENTOR
FRANCIS PETER ALLES
BY John E. Griffiths
ATTORNEY

2,899,200
MECHANISM FOR POSITIONING AN ADHESIVE STRIP MATERIAL IN A SPLICING APPARATUS

Francis Peter Alles, Westfield, N.J., assignor to E. I. du Pont de Nemours and Company, Wilmington, Del., a corporation of Delaware Application April 22, 1958, Serial No. 730,228

1 Claim. (Cl. 271—2.5)

This invention relates to a mechanism for feeding and positioning a continuous adhesive article in a splicing apparatus, such as an apparatus for the splicing of motion picture films.

A known method of splicing films, such as photographic films, requires the use of a thermoplastic adhesive composition which is positioned in the desired location for splicing, followed by heating of the splicing joint under pressure to form a firm bond between the two films being joined.

As is known in the art, the adhesive composition used in such a splicing method can be in the form of a continuous article, such as a monofilament, a multifilament, a coating on a supporting fiber, a ribbon, or a coating on a tape or film. The heat and pressure required to form the splice can be applied by the use of conventional processes and apparatus.

In the use of such splicing apparatus, which can be, for example, of the dielectric heating or of the resistance heating types, it is desirable to feed a length of the thread, tape, or other continuous adhesive article into the splicing area, and position the length precisely where required for optimum results. For example, in lap splicing it is known to position the thread or tape between the overlapping ends of the two film sections to be joined. On the other hand, in butt splicing, it is known to position the tape or ribbon over the abutting ends of the two film sections being joined. After positioning the adhesive article in the desired location, the length required to form the splice can be separated as by cutting from the remainder of the continuous adhesive article.

This invention therefore has for its primary object the provision of a mechanism for feeding and positioning a continuous adhesive article within a splicing zone in a splicing apparatus.

Figure 1:
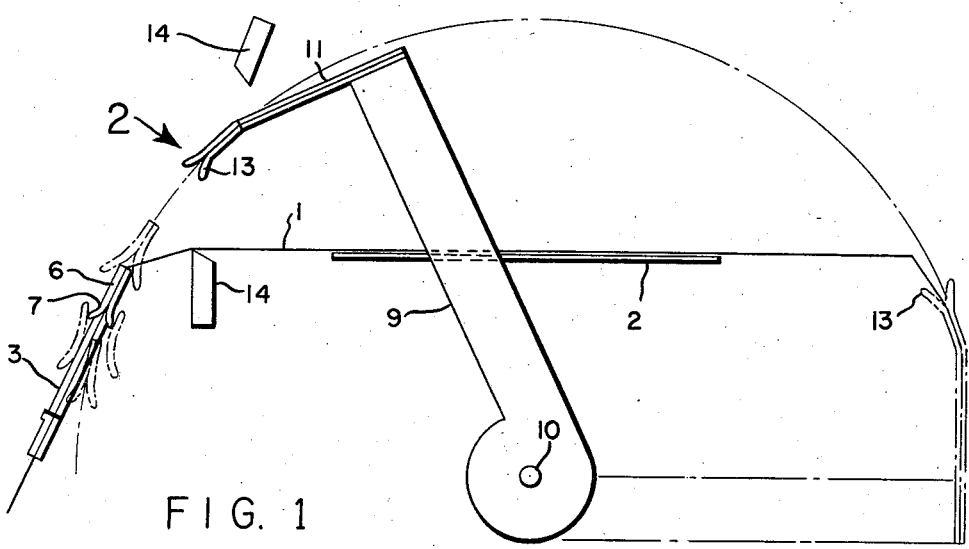
Figure 2:
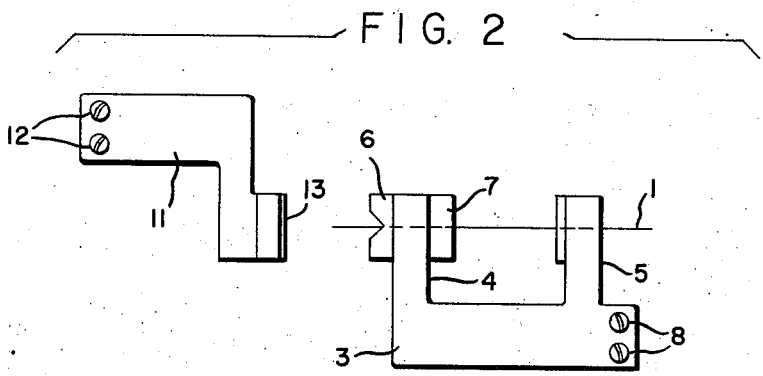

It is believed that the apparatus of this invention can most readily be understood by reference to the accompanying drawing which constitutes part of the present application, and in which similar reference numerals refer to similar parts throughout the several views, wherein Fig. 1 is an elevation view of one embodiment of the apparatus of this invention, illustrating in part the sequential operation of the device of this invention; and Fig. 2 is a plan view of, on the left, the pick-up adhesive article pick-up member and, on the right, the adhesive article feeding member, of my device.

Referring now to the drawings, the feeding and positioning mechanism comprises a device useful in the feeding and positioning of a continuous adhesive article, such as a thread 1, into proper splicing position with relationship to the film 2 to be spliced.

As seen in the drawing, feeding member 3 is made up of feed spring arm 4 and, optionally but preferably, guide arm 5. Feed spring arm 4 has at its outer extremity flared guide members 6 which in turn have protruding lips 7 in the direction from which the adhesive article is approaching the feeding member 3. Elements 3 and 4 are constructed of two side by side leaf springs secured only at one end by any suitable means such as screws 8.

Pivot arm 9 mounted on shaft 10 carries at its outer end pick-up spring arm 11. Like feeding member 3, pick-up spring arm 11 is constructed conveniently of two side by side leaf springs secured to each other at one end by any suitable means such as screws 12. The pick-up spring arm 11 has lip portions 13 at its other end.

After operation of the feeding and positioning device of this invention, the proper length of continuous adhesive article can be severed after placing in proper splicing position by any suitable means, such as by cooperating cutter bars 14.

In a preferred embodiment of the feeding member of the device of this invention, illustrated in Fig. 2, feeding member 3 has guide arm 5 so positioned to direct the path of feed of the continuous adhesive article. It is preferred but not necessary that such a guiding aid be integral with the feeding member 3.

Operation of the device of this invention serves to take the leading end of the adhesive article 1 from the feeding member 3, carry the adhesive article into the splicing zone into proper splicing position laterally across the desired surface of film 2 to be spliced.

This is accomplished by moving, manually or otherwise, pivot arm 9 and its pick-up member so that the latter with its flared lip portions 13 move into contact with the non-flaring portion of the flared guide members 6 of feeding member 3. Such contact with its attendant camming action, serves to spread and separate the two leaf spring elements of pick-up spring arm 11, thereby enabling the pick-up spring arm to move past the flared guide members 6. After moving past the flared guide members 6, the flared lip portions 13, by the action of the leaf springs constituting element 11, come together again, clamping and holding therebetween a portion of the leading end of the continuous adhesive article.

Upon subsequent moving of the pivot arm and pick-up member in a reverse direction, the pick-up extremity of pick-up spring arm 11 readily inserts into the area between the flared lips of flared guide members 6, thereby spreading and separating the later and enabling the lip portions of the pick-up spring arm to pass backwardly between members 6 of the leaf springs of feeding member 3. After passage of the pick-up member carrying the leading edge of the adhesive article, the flared guide members 6 come together again to grasp the adhesive article. This grasp, however, is not sufficiently strong to prevent the guiding therethrough of the adhesive article being acted upon by the pulling force of the pick-up member.

Subsequent continued moving of the pivot arm and the pick-up member carrying the leading edge of the adhesive article serves to move the desired length of the adhesive article into the proper splicing position. Subsequent cutting of the adhesive article leaves the desired length in the splicing zone for the carrying out of the actual splicing operation, as will be understood.

The film 2 to be spliced is positioned as shown in Fig. 1, or in the case of lap splicing the top film section is positioned conventionally over the adhesive, and operation of the device of this invention can then be carried out.

It will be understood that, although the above description has been specific with respect to the attached drawing, varied modifications can be made without departing from the scope and spirit of the invention.

In operation, the elements of the present apparatus are suitably mounted on film splicing apparatus, which can be of the dielectric heating, resistance heating or other types.

As stated above, known splicing equipment can be used in conjunction with the apparatus of my invention. For example, for dielectric heat splicing, a suitable and practical apparatus is described by R. W. Upson, Emery Meschter and W. R. Holm in an article entitled "A Method Using Dielectric Heating for Splicing Motion-Picture Film," in the Journal of the Society of Motion Picture and Television Engineers, vol. 66, No. 1, pages 14–16, January 1957. The described apparatus is a modification of a Bell & Howell professional motion picture film splicer which is the subject of Howell U.S. Patent No. 1,275,431. Other splicing apparatus, such as that described in Griswold U.S. Patent No. 1,596,966, have been successfully adapted for dielectric splicing by modification as taught in the Upson, Meschter and Holm article. One commercially available splicing machine using dielectric heating is the "Neumade" Shepard Electronic Splicer, available from the Neumade Products Corporation, New York City, New York.

Resistance heating type splicing apparatus that can be used in conjunction with the adhesive article feeding and positioning mechanism of this invention are also known in the art. One such splicer is described in Herzig et al., U.S. Patent No. 2,468,629. Another resistance heating splicer, a modification of that described in the Griswold patent referred to above, is disclosed in detail and claimed in Upson and Lusebrink U.S. Patent application Serial No. 609,379, filed September 12, 1956, and assigned to the same assignee as the present invention.

As stated above, the adhesive composition continuous article can be used in many and varied forms. The preferred form is a supporting fiber coated with a suitable adhesive composition. Disclosure of thermo-active adhesives in the form of threads, strips, strands, filaments, coated articles, and the like, can be found, for example, in Snyder U.S. Patent No. 2,060,906 and Wright et al. U.S. Patent No. 2,653,432.

The device of this invention has been found to be particularly effective in carrying out splicing operations on photographic films having film bases of various materials. In particular, it has been found that films of polyethylene terephthalate can be effectively joined to films of polyethylene terephthalate, polyethylene terephthalate to cellulose triacetate, cellulose triacetate to cellulose triacetate, as well as any of these materials to such other various film materials as cellulose acetate, cellulose nitrate, polystyrene, and a polyester of terephthalic acid and 1,4-cyclohexanedimethanol.

Particularly effective adhesives include a copolyester corresponding to the esterification product of (1) hexahydroterephthalic acid in an amount within the range from 10 to 90 mole percent of the copolyester, (2) a saturated aliphatic dicarboxylic acid represented by the formula

$$HOOC(CH_2)_nCOOH$$

where $n$ is an integer from 4 through 8 inclusive, in an amount within the range from 5 to 45 mole percent of the copolyester, (3) an aromatic dicarboxylic acid from the group consisting of terephthalic acid and isophthalic acid in an amount within the range from 5 to 45 mole percent of the copolyester, and (4) a glycol (a saturated aliphatic dihydric alcohol) having from 2 to 10 carbon atoms and 0 to 4 oxygen atoms in addition to the hydroxyl groups. Such a copolyester is described and claimed in Chambers U.S. application Serial No. 718,410, filed March 3, 1958, and assigned to the same assignee as the present application.

A particularly preferred adhesive composition is a high melting high molecular weight fiber forming piperazine polyurethane obtained by condensing piperazine and a bis-chloroformate derivative of a dihydric alcohol selected from the group consisting of ethylene glycol, pentaglycol, 1,4-cyclohexanediol and bis-2,2(4-hydroxycyclohexyl)-propane. These polymers and their preparation are fully disclosed in Wittebecker U.S. Patent No. 2,731,446 and their use in the splicing of film is disclosed and claimed in Albert U.S. application Serial No. 729,224, filed April 18, 1958, and assigned to the same assignee as the present application.

The apparatus of this invention has the advantages that it is compact, simple to operate, inexpensive to manufacture, composed of rugged, inexpensive, easily replaceable components, easily adapted to conventional splicers, and that it assists in the rapid, ready and uniformly reproducible splicing of films. Still other advantages will be apparent from the above description of the invention.

The invention claimed is:

In a mechanism for feeding and positioning a continuous adhesive article in a splicing apparatus, the combination comprising (1) an adhesive article feeding member, said feeding member comprising a feed spring arm constructed of two first leaf springs secured together at their one ends and having at their other ends flared separable guide members positioned in the path of said continuous article, said flared guide members having protruding lips in the direction from which the continuous article approaches said flared guide members, and (2) a pivot arm carrying an adhesive article pick-up member, said pick-up member comprising a pick-up spring arm constructed of two second leaf springs secured together at their one ends and having at their other ends flared separable lip portions, said pivot arm positioned to move said flared lip portions into said path of said continuous adhesive article, said flared lip portions also having protruding lips in the direction from which said continuous adhesive article approaches said lip portions, the aforementioned elements so located with respect to each other whereby (a) upon moving in one direction said flared lip portions of said pick-up member in its operation to pick up a leading end of an adhesive article held firmly between said flared separable guide members of said feeding member, said flared lip portions contact said flared guide members and are spread and separated thereby until moved past said flared separable guide members, whereupon said flared lip portions come together again clamping and holding therebetween said adhesive article, and (b) upon subseqent moving in a reverse direction said flared lip portions of said pick-up member, carrying said adhesive article to position said adhesive article in proper splicing position, said flared guide members are contacted by said other ends of said pickup member and are spread and separated thereby until said other ends of said pick-up member are moved past said flared guide members, whereupon said flared guide members come together again to guide therebetween said adhesive article, and, (c) upon subsequent moving of said pivot arm and said pick-up member, said adhesive article is moved into proper splicing position.

No references cited.